United States Patent Office 3,138,573
Patented June 23, 1964

3,138,573
ELASTOMERIC POLYMER AND PROCESS FOR MAKING THE SAME
Gene M. Le Fave, Whittier, and Frank Y. Hayashi, San Pedro, Calif., assignors to Coast Pro-Seal & Mfg. Co., Los Angeles, Calif., a corporation of California
No Drawing. Filed May 23, 1960, Ser. No. 30,782
7 Claims. (Cl. 260—76)

This invention relates to elastomeric polymers and processes for making the same.

It is an object of this invention to provide a superior elastomer or rubber having high tensile strength and good elongation properties. It is a further object of this invention to provide an elastomer or rubber which is tough and highly resistant to corrosive effect of ambient environments, particularly hydrocarbons in liquid or vapor form.

Basically the invention relates in a preferred specific form to the use of a sulfone activated diethylenic compound as an agent for producing a vulcanized or cured elastomer from liquid, high molecular weight polythiol compounds. In the process, the polythiol is cast in liquid state and is cured in place by the sulfone to a final elastomeric state, with or without the application of heat.

The elastomers of the present invention are useful as leather impregnants, as repair and coating materials in the rubber industry, in the aircraft industry as fuel tank and air frame sealants, in the electrical industry as caulking and filling materials, and as binders for rocket fuels and solid propellants.

The sulfone activated diethylenic compound, which is the acceptor in the reaction, is preferably one which has ethylenic (—C=C—) linkages activated by a sulfone (—SO$_2$—) group adjacent the ethylenic linkages. The preferred specific acceptor is divinyl sulfone.

The polythiol, which is the donor in the reaction, is a branch chain polymer terminated with thiol groups and consisting of disubstituted alkyl or aryl groups, linked by sulfide, polysulfide, oxide, ester, or urethane linkages. At present, donors readily available on the commercial market are polysulfide liquid polymers and more particularly polyalkylene polysulfide, e.g., as discussed in Golding, Polymers and Resins, Van Nostrand, 1959, starting at page 360. Such polymers are represented by the general formula:

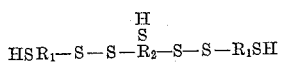

In this formula R$_1$ represents repeating units of bis-(ethylene oxy)methane, and R$_2$ indicates propyl segments. These polymers are generally prepared from bis (2-chloroethyl) formal and trichloropropane reacted with alkali metal polysulfide. The chains are terminated by thiol (SH) groups with thiol groups occurring occasionally along the chain, depending upon the mole percentage of trifunctional monomers used, in the chain of repeating units. Commercially, such liquid polymers are available from about 500 to about 8,000 molecular weight. At 25 degrees centigrade they have viscosities in excess of 200 centipoises.

These polysulfide liquid polymers are described in an article by Jorczak et al. in Industrial and Engineering Chemistry, volume 43, page 324, February 1951, and also in Patent 2,466,963, Patrick and Ferguson, issued April 12, 1949.

In the past monomeric donor compounds containing di-hydroxyl, and dithiol groups have been reacted with sulfone activated ethylenic compounds serving as the acceptor, to produce polymers which at low degrees of polymerization are viscous liquids or low melting solids, and at higher degrees of polymerization have a rigidity suitable for use as coating materials. In the present invention, the resulting polymer is universally a solid elastomer, and this is achieved by employing as donor only high molecular weight polymeric liquid resins containing more than two terminal thiol groups. In the present invention stoichiometric equivalents of donor and acceptor are employed with a tolerance of plus or minus 15%. That is to say, the mixture ranges from 0.85 to 1.15 equivalents of acceptor to one equivalent of donor.

The number of equivalents as the term is used herein refers to the weight of the compound divided by the equivalent weight of the compound. The equivalent weight of the compound is in turn defined as the molecular weight divided by the number of reactive groups per molecule. In the case of the donor, this is the number of thiol groups per molecule of donor. In the case of acceptor, this is the number of sulfone activated ethylenic groups per molecule of acceptor.

It has been found that an excess of acceptor up to about 15% increases tensile strength and hardness of the resulting product.

It appears to be characteristic of the present reaction that polyols and polythiols are not equally reactive with the acceptor. For example, reaction between polypropylene glycol of 400 molecular weight and the sulfone activated diethylenic acceptor either does not occur, or is so slow as to be of little value, for the preparation of cast-in-place elastomers. On the other hand polymeric donors with thiol end groups react readily, even at room temperatures to form useful elastomeric compounds in accordance with the present invention. This appears to be in contrast with monomeric polyhydric chemicals where both glycols and thiols are approximately equally reactive with sulfone activated di-ethylenic compounds.

The principal characteristic of the present invention appears to be the nature of the vulcanization role played by the acceptor.

In accordance with the present invention, an active hydrogen of a terminal thiol group (—SH) of the liquid, high molecular weight donor resin, combines with the sulfone activated di-ethlenic compound. Addition usually occurs by hydrogen adding to the alpha carbon atom of the sulfone group, although it is possible that some of the hydrogen addition takes place on the beta carbon atom. In either case, chain extension and/or vulcanization occurs. When the donor is difunctional, the addition results in chain extension, and the physical properties, e.g. molecular weight, of the resultant polymer depend in large degree upon the stoichiometry of the system. In the present invention, since the donor compound is a liquid polymer having more than two thiol groups, the addition of the thiol hydrogen to the acceptor results in a vulcanization of the liquid resin, even in excess of the acceptor. The most practical, from a commercial standpoint, of the acceptor compounds are the monomeric sulfonyl chemicals having from one to two intermediate sulfonyl radicals, each linked to a vinyl group. The following such have been found to be satisfactory:

Divinyl sulfone $$CH_2=CHSO_2CH=CH_2$$

Isopropenyl sulfone

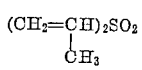

Propenyl sulfone $$(CH_3CH=CH-)_2SO_2$$

1,2-bis (vinyl sulfonyl) ethane $$CH_2=CHSO_2-CH_2-CH_2SO_2CH=CH_2$$

1,4-bis (vinyl sulfonyl) butane $$CH_2=CHSO_2(CH_2)_4SO_2CH=CH_2$$

Bis (vinyl sulfonyl) methane $$CH_2=CHSO_2CH_2SO_2CH=CH_2$$

Styryl sulfone $$(C_6H_5CH=CH-)_2SO_2$$

Alpha-ethyl vinyl sulfone $$(CH_2=CC_2H_5)_2SO_2$$

Alpha-n-propyl vinyl sulfone $$(CH_2=CC_3H_7)_2SO_2$$

Alpha-phenyl vinyl sulfone $$(CH_2=CC_6H_5)_2SO_2$$

1-butenyl sulfone $$(C_2H_5CH=CH-)_2SO_2$$

Bis (beta,beta'-vinyl sulfonyl) ethyl ether $$(CH_2=CHSO_2CH_2CH_2)_2O$$

Thiophene dioxide

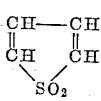

Substituted thiophene dioxide

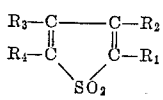

where $R_1$, $R_2$, $R_3$ and $R_4$ may be either a hydrogen, a methyl, ethyl, phenyl, carbonyl or halogen group.

Donor compounds which operate satisfactorily in the present reaction, are characterized by the following:

(1) They range in viscosity from free-flowing liquids to very viscous liquids;

(2) They have high molecular weights, from 500 to 10,000;

(3) They have terminal thiol groups and usually have one or more thiol groups scattered along the molecular chain;

(4) Their equivalent weight or grams per thiol group, as determined by end group analysis, is in the range of 250–5,000.

Chemically the donors are branch chain polymers terminated with thiol groups and having repeating units comprising alkylene groups connected by a linkage selected from esters, polysulfides, urethanes, or oxygen or sulphur atoms.

For the donor, the presence of something more than two thiol groups per molecule, on the average, is requisite. It has been found that donors having about 2.3 thiol groups per molecule, on the average, are very effective. The remainder of the molecular structure is of secondary importance, except in the manner in which it influences the fluidity of the resins.

The vulcanization of the donor presents problems not ordinarily encountered in the creation of a conventional elastomer. Materials such as styrene-butadiene rubber or natural rubber are composed of long chain molecules having an average molecular weight of 300,000 or above. They are usually vulcanized by the introduction of cross links. On the other hand, liquid polymers are composed of relatively small molecules, and to achieve toughness and good mechanical properties these smaller molecules must be linked end to end, to form the high molecular weight structure. This process is known as chain extension. In addition to chain extension, these large molecules must be crosslinked to develop useful elastomeric properties. To offer sites where such cross linking can occur, the donor compound should have a degree of thiol functionality greater than 2, as indicated hereinbefore. Varying the ratio of cross linking to chain extension alters the properties of the vulcanizate over a wide range. As the proportion of cross linking is increased, vulcanizate properties, such as resilience and resistance to compression set, improve. As the proportion of cross linking is decreased, there is an improvement in properties, such as tensile strength and flexibility.

As mentioned hereinbefore, polyalkylene glycols, per se, are not suitable for use as donors. However, when thiol terminated derivatives are made of these glycols, they will serve quite satisfactorily as donors. Especially suitable, because of the ease of synthesis, are thiol terminated esters of polyalkylene glycols. Tri and tetra functional polyols were found to be satisfactory, although diols were not. This is probably because the esterification reaction did not go to 100% completion, thus leaving many monomers and chain stoppers, and also because the diols did not have a functionality greater than two.

Derivatives of alkylene oxides which may be satisfactorily terminated with a thiol group include the commercially available products listed below.

Polyglycol 112–3: A triol derived from glycerine and ethylene and propylene oxides; a viscous liquid having a viscosity at 100 degrees Fahrenheit of 225 cks. It is a trihydroxy polypropylene glycol modified to have primary terminal hydroxyl groups and consequently greater reactivity.

Pluracol TP: A series of polyoxypropylene derivatives of trimethylolpropane. These compounds have three terminal hydroxy groups.

Tetronic polyols: Propylene-ethylene oxide derivatives of ethylene diamine.

Niax LHT: A 1500 molecular weight polyoxyalkylene glycol with three terminal hydroxy groups; a propylene oxide derivative of 1,2,6-hexane triol.

In general, polyoxyalkylene glycols meeting the following description were found to be very suitable for thiol group termination and subsequent employment in the present invention. The glycols should have an average molecular weight of 400–9000 and be an alkylene oxide derivative of a polyhydric compound. The alkylene oxide should respond to the formula:

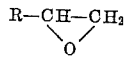

where R may consist of either a hydrogen atom, an organic radical having 1 to 6 carbons or a mixture of hydrogen and such a radical. The starting polyhydric compound may be either tri or tetra functional polyols having 3–8 carbon atoms or a diamine containing 2–8 carbons.

The termination of the glycol by the thiol groups is preferably accomplished by esterification with thiol substituted organic acids and esters having from 1 to 6 carbons, such as thioglycolic acid, beta-thiolpropionic acid, thiomalic acid and esters of these acids, such as the ethylene glycol, methyl and ethyl esters.

Similarly thiol terminated liquid polymers have been prepared from polyesters having excess hydroxyl groups and the thiol terminated ester or acid.

Suitable donors were also prepared from the reaction product of diisocyanate prepolymers and dithiol compounds. For example, one mole of a polymer prepared from polytetramethylene ether glycol and toluene diisocyanate ("Adiprene L") and two moles of a dithiol compound, such as ethylene-bis-thioglycolate, produced a resinous material which was vulcanized by the acceptor of the present invention.

Also it is possible to obtain donor compounds by saturating polyolefins with hydrogen sulfide as in the following generalized formula:

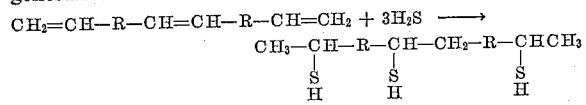

Suitable catalysts for the vulcanization reaction forming the subject of this invention are those bases or alkaline compounds which are unreactive with the acceptors. For practical purposes, strong bases are preferred. For example, the following have been found to be of exceptional utility: tetramethyl guanidine, N,N,N,N',N',N'-triethylene diamine, barium hydroxide, sodium carbonate, triethyl amine, tripropyl amine and calcium oxide. Only small amounts of the base are required, generally from 0.005 to 1.0%. Practical curing temperatures lie in the room temperature range, e.g., 15° C. to 60° C. Temperatures decidedly outside of this range effect a satisfactory cure, but for practical reasons there is no point in going outside this range except to accelerate the reaction.

In accordance with the present invention, it has also been found that certain advantages are obtained by reacting the donor and acceptor compounds in a step-wise manner, i.e., to prepare a prepolymer. The first step, or prepolymer formation, is effected by reacting one equivalent of the polythiol donor and approximately two equivalents of the sulfone activated diethylenic acceptor compound. The second step, or vulcanization, occurs when another equivalent of the polythiol donor is added to the prepolymers.

The greatest advantage derived from the use of a prepolymer is a marked decrease in toxicity of the acceptor compounds. For example, it is known that divinyl sulfone is highly toxic by oral ingestion and absorption through the skin and can cause severe skin and eye burns. It has been indicated that divinyl sulfone, when administered to rats by mouth, has an $LD_{50}$ by single oral dose of 0.14 gram per kilogram of body weight. By single skin absorption on rats, it has an $LD_{50}$ of 0.022 milliliter per kilogram. In contrast, the prepolymer of divinyl sulfone has much less toxicity, an acute oral $LD_{50}$ value of 10 grams per kilogram and an acute dermal $LD_{50}$ value in excess of 20 grams per kilogram. The prepolymer is therefore considered to be only slightly toxic by oral ingestion and essentialy non-toxic by dermal absorption.

Another advantage of using a prepolymer is that it makes possible a two-part system for a castable elastomer, in which the two parts are virtually equal in volume and weight. The equal parts greatly facilitate the mixing of the two components, by removing the criticality of proportioning of the mixing and also offer certain advantages in packaging.

The use of sulfone activated diethylene compounds as described in this invention has many other notable advantages over the method of vulcanizing thiol terminated liquid polymers in the conventional manner. Heretofore, the mechanism by which the liquid polysulfide resins have been vulcanized, or cured, has been through an oxidation reaction where the mercaptan is believed oxidized to a disulfide as in the following:

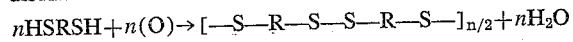

A wide variety of oxidizing agents are used, for example, zinc peroxide, lead peroxide, manganese dioxide and various organic peroxides such as cumene hydroperoxide. An objection to this type of reaction, which is not inherent in the addition reaction of this invention, is that by-products are formed, such as the reduced form of the oxidant and water. With no water being formed during the vulcanization of the elastomers of this invention, certain properties are directly enhanced. For example, no bubbles are formed upon heat cures; there is an increased resistance to compression set; there is an improvement in rheological properties; there is an early attainment of final physical properties; heat stability is improved in the medium range, 100°–300° F.; there is an increased resistance to moisture. In the examples which follow, the polymers referred to as polysulfides are polyalkylene polysulfide liquid polymers terminated with thiol groups. The halides from which these polymers were formed are bis(chloroethyl) formal and trichloropropane. These polymers range in molecular weight from 800 to 8,000. The equivalent weights were determined by end group analysis.

*Example 1*

To 193 grams polysulfide liquid polymer, equivalent weight 322, (0.6 equivalent) was added 0.23 gram (0.1%) triethylene diamine. After warming the mixture slightly so that the amine would be readily dissolved, the mixture was brought to room temperature. 35.4 grams (0.6 equivalent) divinyl sulfone were added and stirred in. After an exotherm to about 90° C., the liquid was poured into molds and allowed to cure at ambient temperature.

|  | 1 Week | 4 Weeks |
|---|---|---|
| Hardness (Shore "A") | 29 | 46 |
| Tensile (p.s.i.) | 67 | 120 |
| Elongation (ultimate), percent | 170 | 100 |

*Example 2*

In a manner similar to that used in Example 1, 296 grams (0.5 equivalent) polysulfide liquid polymer, equivalent weight 592, 0.33 gram triethylene diamine and 30.2 grams (0.513 equivalent) divinyl sulfone were mixed together and poured into molds.

|  | 1 Week | 4 Weeks |
|---|---|---|
| Shore "A" Hardness |  | 20 |
| Tensile (p.s.i.) | 53.2 | 55.7 |
| Elongation (ultimate), percent | 290 | 260 |

*Example 3*

In a manner similar to that used in Example 1, 255 grams (0.5 equivalent) polysulfide liquid polymer, equivalent weight 510, 0.29 gram (0.1%) triethylene diamine and 29.6 grams (0.5 equivalent) divinyl sulfone were mixed together and then poured into molds. There was an exotherm of about 70° C.

|  | 1 Week | 4 Weeks |
|---|---|---|
| Shore "A" Hardness | 24 | 27 |
| Tensile (p.s.i.) | 57.2 | 63.0 |
| Elongation (ultimate), percent | 90 | 100 |

*Example 4*

482 grams (0.25 equivalent) polysulfide liquid polymer, equivalent weight 1,930, 0.5 gram (0.1%) triethylene diamine and 14.8 gram (0.25 equivalent) divinyl sulfone were mixed together as in Example 1. A slight exotherm to 47° C. was noted.

|  | 1 Week | 4 Weeks |
|---|---|---|
| Shore "A" Hardness | 23 | 29 |
| Tensile (p.s.i.) | 52 | 59.5 |
| Elongation (ultimate), percent | 150 | 70 |

Example 5

Using the procedure of Example 1, 525 grams (0.25 equivalent) polysulfide liquid polymer, equivalent weight 2,100, 0.54 gram triethylene diamine and 14.8 gram (0.25 equivalent) divinyl sulfone were mixed together.

|  | 1 Week | 4 Weeks |
|---|---|---|
| Shore "A" Hardness | | 22 |
| Tensile (p.s.i.) | 19 | 61 |
| Elongation (ultimate), percent | 96 | 220 |
| | 330 | |

Example 6

493 grams (0.5 equivalent) of polysulfide liquid polymer, equivalent weight 985, 30.2 grams (0.512 equivalent) divinyl sulfide and 0.52 gram (0.1%) triethylene diamine were mixed together as in Example 1.

|  | 1 Week | 4 Weeks |
|---|---|---|
| Shore "A" Hardness | | 30 |
| Tensile | 81.0 | 92.2 |
| Elongation (ultimate), percent | 230 | 165 |

Example 7

Using the technique of Example 1, 738 grams (0.5 equivalent) polysulfide liquid polymers resin, equivalent weight 1,475, 0.7 gram (0.1%) triethylene diamine and 30 grams (0.512 equivalent) divinyl sulfone were mixed together:

|  | 1 Week | 4 Weeks |
|---|---|---|
| Shore "A" Hardness | | 30 |
| Tensile (p.s.i.) | 64.8 | 77.4 |
| Elongation (ultimate), percent | 200 | 160 |

Example 8

Following the procedure of Example 1, 772 grams (0.25 equivalent) of a polysulfide liquid polymer, equivalent weight 3,090, 14.8 grams (0.25 equivalent) divinyl sulfone and 1.58 grams (0.2%) triethylene diamine were mixed together.

|  | 1 Week | 4 Weeks |
|---|---|---|
| Shore "A" Hardness | | 33 |
| Tensile (p.s.i.) | 58.0 | 81.5 |
| Elongation (ultimate), percent | 150 | 200 |

Example 9

To illustrate the advantages of having a tri-thiol compound, rather than a di-thiol functionality, and the effect that this functionality has upon the amount of divinyl sulfone needed to bring about an equivalent cure, the following comparison was made:

Two polysulfide liquid polymers were each reacted with varying amounts of divinyl sulfone and allowed to cure. These polysulfide resins each have an average molecular weight of 1000 and differ only in their degree of tri-functionality or cross-linking.

Polymer No. 1 was made from 98 mole percent of bis (2-chloroethyl) formal and 2 mole percent of trichloropropane, the cross-linking agent, while Polymer No. 2 was prepared from 99.5 mole percent of the same formal and 0.5% of trichloropropane. Hence it can readily be seen that the degree of cross-linking is much greater in the case of Polymer No. 1.

In the following examples, 0.1% triethylene diamine was used in each instance, and the procedure used was as in Example 1.

| Property, 1 Week | Liquid Polymer | Ratio of Equivalents, D.V.S.: Liquid Polymer | | | |
|---|---|---|---|---|---|
| | | 0.0971:1 | 1.0:1 | 1.025:1 | 1.06:1 |
| Hardness (Shore "A") | No. 2 | * | * | 20 | 25 |
| | No. 1 | 10 | 18 | 27 | 40 |
| Tensile (p.s.i.) | No. 2 | * | * | 53.2 | 74.9 |
| | No. 1 | 15.0 | 28.4 | 48.0 | 97.8 |
| Elongation (percent) | No. 2 | * | * | 290 | 260 |
| | No. 1 | 190 | 190 | 85 | 85 |

*Not sufficiently cured to take reading.

Example 10

A prepolymer of divinyl sulfone and polyalkylene polysulfide liquid polymer was prepared in the following manner:

2,000 grams (about 2 mole) polysulfide resin and 413 grams (3.5 mole) divinyl sulfone were placed in a resin reaction flask and mixed thoroughly. 2 grams (0.1%) triethylene diamine were then added while continuing to stir. An exotherm to about 85° C. occurred after which the stirring was continued for 6 hours to ensure a complete reaction. The temperature during this time was allowed to drift. The equivalent weight, or reactivity weight, of the prepared pre-polymer was determined by experimental methods to be 870.

The pre-polymer was compounded on a standard 3-roll mill as follows:

| | Grams |
|---|---|
| Liquid pre-polymer | 1395 |
| Silene EF | 105 |

A portion of liquid polymer was compounded in a like manner as follows:

| | Grams |
|---|---|
| Polysulfide resin | 1395 |
| Silene EF | 105 |
| Triethylene diamine | 1.5 |

Silene EF is precipitated hydrated calcium silicate pigment having average particle size of 0.030 micron.

The two parts, the prepolymer acceptor and polysulfide donor were mixed in various ratios and after one week of ambient temperature cure, physical properties were noted. Also for comparison the latter formulation was cured with the addition of 1.0% tetramethylthiuram disulfide and 5% $MnO_2$, incorporated as a paste, a normal oxidation type of cure for the liquid polysulfides.

| Ratio, Donor: Acceptor | 1:0.95 | 1:1 | 1:1.05 | 1:1.1 | 1:1.15 | $MnO_2$ |
|---|---|---|---|---|---|---|
| Hardness (Shore "A") | 27 | 34 | 35 | 35 | 30 | 45 |
| Tensile (p.s.i.) | 72 | 96 | 114 | 100 | 79 | 119 |
| Elongation (percent) | 150 | 100 | 100 | 100 | 120 | 60 |

Example 11

210 grams (0.2 equivalent) Adiprene L and 45 grams (0.43 equivalent) ethylene bis-thio glycolate were mixed together and 1.25 grams lead octoate was added and thoroughly mixed together. After an initial exotherm, the mixture was held at 140° F. for 2 hours. After cooling to room temperature, 13.6 grams (0.23 equivalent) divinyl sulfone were added, followed by 1.25 grams N-methyl morpholine. Twenty-four hours at ambient temperature produced a rubbery solid.

Example 12

To illustrate the type of reaction product obtained from a low molecular weight monomeric donor and divinyl sulfone, added in equal ratios, the following experiments were carried out:

| Donor | M. Wt. | Catalyst | Exotherm | Reaction Product |
|---|---|---|---|---|
| Butane dithiol | 122 | N-methyl morpholine. | 110° C | Hard, white wax. |
| Decane dithiol | 206 | ____do____ | Slight | Do. |
| Tri-thioglycolic acid ester of trimethylol propane. | 356 | Tetramethyl guanidine. | ____do____ | Stiff, brittle. |

*Example 13*

600 grams (0.63 equivalent) Dow polyglycol 112–3 were esterified with 78 grams (—.85 equivalent) thioglycolic acid. The esterification was carried out at 160–170° C., using toluene to azeotropically remove the water. After the theoretical amount of water had been collected, the excess thioglycolic acid and toluene were removed under vacuum. Analysis of the ester indicated that its equivalent weight per thiol group was 1500 grams.

To 300 grams (0.2 equivalent) of the above thiol terminated polyglycol was added one gram tetramethylene diamine. The incorporation of 12.4 grams (0.248 equivalent) divinyl sulfone gave a rubbery product after 24 hours.

The Dow polyglycol 112–3 used in this example is a trihydroxy polypropylene glycol modified to have primary terminal hydroxyl groups. The sample used had a hydroxyl value of 58.74, or an average molecular weight of 2865.

*Example 14*

A high molecular weight, thiol terminated polymer was prepared in the following manner:

3 grams of dimethyl toluidine and 3 grams of tin dilaurate were added to 12,000 grams (0.5 mole) of Pluronic L–81. With good agitation, 170 grams (0.975 mole) toluene diisocyanate were added. After the exotherm and stirring for three hours, the resin was cooled and 199 grams (0.95 mole) ethylene bis-thioglycolate were added. The resin was taken to 100° C. and then cooled.

To 153 grams of the above viscous resin was added 0.5 gram N,N,N',N'-tetramethyl 1,3-butane diamine and 6.2 grams (0.105 equivalent) divinyl sulfone. After stirring thoroughly, the mixture cured to a strong, hard rubber-like material.

Pluronic L–81 is a block polymer having polyoxypropylene chains terminated with polyoxyethylene groups.

*Example 15*

A poly functional thiol compound was prepared from a tri-functional polypropylene glycol, Niax LHT 112, and thioglycolic acid, using the same procedure as in Example 13.

Niax LHT 112 is a trifunctional polyoxypropylene glycol made with hexane triol as the initiator. The average molecular weight is 1500.

To 150 grams of this thiol terminated resin was added 0.3 gram of tetramethyl guanidine and 12.4 grams (0.21 equivalent) divinyl sulfone. After mixing thoroughly, the resin cured to a soft, tacky mass at room temperature. A force cure of 140° F. for 12 hours produced a firm, rubbery compound.

*Example 16*

A trifunctional thiol compound was prepared in a manner similar to that described in Example 13. In this case, the polyol used was Pluracol TP 440. This is one of a series of trifunctional polypropylene glycols derived from the polymerization of propylene oxide and initiated by trimethylol propane.

The thiol terminated resin was analyzed to have an equivalent weight of 253.

To 127 grams (0.5 equivalent) of this polyfunctional thiol compound was added 0.5 gram N,N,N',N'-tetramethyl 1,3-butane diamine and 31.0 grams (0.525 equivalent) divinyl sulfone. After a notable exotherm, the compound became a hard rubber with a Shore "A" hardness of 50.

*Example 17*

A thiol terminated liquid resin was prepared from "Tetronic 304" by using the same technique as in Example 13.

The Tetronics are a series of polyols prepared by the sequential addition of propylene and ethylene oxides to ethylenediamine. The molecular weight of Tetronic 304 was approximately 1700.

To 186 grams of the polyfunctional thiol compound and 0.5 gram of N,N,N',N'-tetramethyl 1,3-butanediamine was added 12.4 grams (0.22 equivalent) divinyl sulfone. A firm, slightly tacky, rubbery product was obtained.

*Example 18*

A polyester with thiol termination was prepared from the following formulations:

Diethylene glycol, 296 grams (2.8 moles)
Trimethylol ethane, 60 grams (0.5 mole)
Succinic anhydride, 210 grams (2.1 moles)
Thioglycolic acid, 161 grams (1.75 moles)

Using a 1,000 ml. 3-neck round bottom flask equipped with a mechanical stirrer, air condenser, nitrogen inlet tube and thermometer, all the polyols and succinic anhydride were heated to 200° C., under good agitation and inert gas flow. The mixture was held at 200° C., for one hour with the condenser attached.

After this, the condenser was removed and the resin processed at 200° C. for an acid value of 5. This took about 6 hours. The resin was then cooled to below 100° C. and the thiolacetic acid added. 35 grams of toluene was added to the resin and the water trap fitted to the assembly to receive and measure the water removed.

The resin was processed at 170° C. until the theoretical amount of water was collected. To rid the system of unreacted monomers, the resin was heated to 200° C. under a reduced pressure of 1–2 mm. Hg. The resultant liquid resin had an equivalent weight of 384, as determined by an end group analysis for thiol groups.

To 96 grams (—.25 equivalent) of the liquid resin and 0.22 gram of N,N,N',N'-tetramethyl,1,3-butanediamine was added 15.5 grams (0.263 equivalent) divinyl sulfone. After an immediate exotherm, there was produced a soft rubbery compound.

*Example 19*

To 363 grams of the prepolymer, prepared as in Example 10, was incorporated 226 grams of precipitated calcium carbonate. A 3-roll laboratory paint mill was used to disperse the pigment.

In another container, 216 grams of precipitated calcium carbonate was added to 327 grams of a thiol terminated polyalkylene polysulfide liquid polymer. The polysulfide resin was prepared from 98 mole percent of bis (2-chloroethyl) formal and 2 mole percent of trichloropropane, and had a molecular weight of about 1,500. The calcium carbonate was thoroughly dispersed by passing the mixture over a 3-roll paint mill.

The two parts, that of the prepolymer and that of the polysulfide were mixed together in approximately equal parts by weight until uniform. The working life of this mixture was 12 hours and it cured completely in 72 hours to an excellent rubber having the following properties:

Hardness _____ 55 Shore "A".
Tensile strength _____ 250 p.s.i.
Ultimate elongation _____ 400%.

*Example 20*

To 57 grams of the prepolymer, as prepared in Example 10, was added 1.5 grams formic acid and the mixture thoroughly stirred.

In another container, 37 grams of a liquid polysulfide resin of about 1,000 molecular weight was mixed with 0.3 gram triethylene diamine.

The two components were then mixed together and placed in a sealed container. After two months the viscosity had increased from 75 poises to 200 poises, and still showed an extended can stability. In a film thickness of 0.1 inch, the above resin cured in 72 hours at 158° F., and in two weeks at ambient temperatures to an excellent quality rubber useful as a protective coating, caulking materials, etc.

The terms sulfone activated diethylenic, sulfone diethylenic, and diethylenic sulfone have been used herein to mean a compound having two groups with ethylenic unsaturation between carbon atoms adjacent to a sulfonyl group. The ethylenically unsaturated groups can be either bonded to the same sulfonyl group or to two different sulfonyl groups in the molecule.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the claims.

What is claimed is:

1. An elastomeric polymer comprising the reaction product of an acceptor and a donor reacted in a ratio of 0.85 to 1.15 equivalents of acceptor to one equivalent of donor, said acceptor comprising a sulfone diethylenic compound wherein the ethylenic unsaturation is adjacent to a sulfonyl group, and said donor comprising a liquid polymer terminated with thiol groups and having at least one intermediate thiol group providing a cross-linking site, the repeating units of said polymer comprising alkylene groups of 1 to 6 carbon atoms, said intermediate thiol group being attached to an alkylene group, said alkylene groups being connected by a linkage selected from the group consisting of sulfide, polysulfide, oxide, ester and urethane linkages, said donor having a molecular weight of from about 500 to 8,000 and having an average thiol functionality ranging from greater than 2 to 4.

2. An elastomeric polymer comprising the reaction product of an acceptor and a donor reacted in a ratio of 0.85 to 1.15 equivalents of acceptor to one equivalent of donor, said acceptor comprising divinyl sulfone and said donor comprising a thiol terminated liquid polyalkylene polysulfide resin, produced from alkaline polysulfide and organic dihalides and trihalides and having a molecular weight from 500 to 8,000.

3. An elastomeric polymer comprising the reaction product of an acceptor and a donor reacted in a ratio of 0.85 to 1.85 equivalents of acceptor to one equivalent of donor, said acceptor comprising divinyl sulfone and said donor comprising a thiol terminated polyoxyalkylene glycol having an average functionality ranging from 2 to 4 and a molecular weight ranging from 500 to 4,500, and wherein the alkyl groups contain from 2 to 6 carbon atoms.

4. An elastomeric polymer comprising the reaction product of from 0.85 to 1.15 equivalents of divinyl sulfone and one equivalent of a thiol terminated, saturated polyester resin synthesized from polyhydric alcohol and polybasic acid and having an average molecular weight of from 500 to 5,000.

5. Process for creating an elastomeric polymer in multiple stages comprising first reacting approximately two equivalents of acceptor and one equivalent of donor, said acceptor comprising divinyl sulfone and said donor comprising a thiol terminated liquid polyalkylene polysulfide resin produced from alkaline polysulfide and organic dihalides and trihalides and having a molecular weight of from 500 to 8,000, to form a pre-polymer; and then reacting additional donor with the prepolymer to bring the net ratio to a range of from 0.85 to 1.15 equivalents of acceptor to one equivalent of donor, to form a solid elastomer.

6. Process for the production of an elastomeric polymer comprising mixing together an acceptor and a donor in a ratio of 0.85 to 1.15 equivalents of acceptor to 1.0 equivalent of donor, said acceptor comprising a sulfone diethylenic compound wherein the ethylenic unsaturation is adjacent to a sulfonyl group and said donor comprising a liquid polymer terminated with thiol groups and having at least one intermediate thiol group providing a cross-linking site, the repeating units of said polymer comprising alkylene groups of 1 to 6 carbon atoms, said intermediate thiol group being attached to an alkylene group, said alkylene groups being connected by a linkage selected from the group consisting of sulfide, polysulfide, oxide, ester and urethane linkages, said donor having a molecular weight of from about 500 to 8,000 and having an average thiol functionality ranging from greater than 2 to 4.

7. A process for producing an elastomeric polymer as claimed in claim 5, including in addition the mixing of a volatile acid in sufficient quantity to inhibit the reaction, and thereafter exposing the total mixture to the atmosphere, thereby to evaporate the inhibiting acid and effect polymerization of the mixture.

References Cited in the file of this patent
UNITED STATES PATENTS

| | | |
|---|---|---|
| 2,466,963 | Patrick et al. | Apr. 12, 1949 |
| 2,505,366 | Schoene | Apr. 25, 1950 |

OTHER REFERENCES

Rubber Age, volume 67, issue No. 6, page 700, published September 1950.